(12) United States Patent
Loehr et al.

(10) Patent No.: US 11,546,936 B2
(45) Date of Patent: Jan. 3, 2023

(54) PROCEDURES FOR MULTIPLE ACTIVE BANDWIDTH PARTS

(71) Applicant: Lenovo (Singapore) PTE. LTD., New Tech Park (SG)

(72) Inventors: Joachim Loehr, Wiesbaden (DE); Prateek Basu Mallick, Dreieich (DE); Alexander Johann Maria Golitschek Edler von Elbwart, Darmstadt (DE); Ravi Kuchibhotla, Clarendon Hills, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 16/408,182

(22) Filed: May 9, 2019

(65) Prior Publication Data

US 2019/0349983 A1 Nov. 14, 2019

Related U.S. Application Data

(60) Provisional application No. 62/669,300, filed on May 9, 2018.

(51) Int. Cl.
*H04W 72/14* (2009.01)
*H04L 1/16* (2006.01)
(Continued)

(52) U.S. Cl.
CPC .......... *H04W 72/14* (2013.01); *H04L 1/1614* (2013.01); *H04L 1/1819* (2013.01);
(Continued)

(58) Field of Classification Search
None
See application file for complete search history.

(56) References Cited

U.S. PATENT DOCUMENTS

2013/0128856 A1* 5/2013 Iwai ................ H04L 5/001
370/329
2018/0343154 A1* 11/2018 Park ................ H04L 5/005
(Continued)

FOREIGN PATENT DOCUMENTS

EP 3478019 A1 10/2018

OTHER PUBLICATIONS

Jeongho Jeon ("NR Wide Bandwidth Operations", Intel Corporation, dated Dec. 2017, all pages). (Year: 2017).*
(Continued)

*Primary Examiner* — Gregory B Sefcheck
*Assistant Examiner* — Srinivasa R Reddivalam
(74) *Attorney, Agent, or Firm* — Kunzler Bean & Adamson

(57) ABSTRACT

Apparatuses, methods, and systems are disclosed for efficient management of multiple active BWPs. One apparatus includes a processor and a transceiver that communicates with a serving cell using multiple active bandwidth parts ("BWPs") for the serving cell. Here, the serving cell is configured with multiple configured grants, each active BWP configured with one of the multiple configured grants. The processor receives an indication from a base unit of which configured grants are to be used upon a change to the multiple active BWPs and selectively activates a configured grant in response to a change to the multiple active BWPs.

16 Claims, 6 Drawing Sheets

(51) Int. Cl.
*H04L 1/18* (2006.01)
*H04L 5/00* (2006.01)
*H04W 52/24* (2009.01)
*H04W 52/36* (2009.01)
*H04W 80/02* (2009.01)

(52) U.S. Cl.
CPC ......... *H04L 5/0098* (2013.01); *H04W 52/242* (2013.01); *H04W 52/365* (2013.01); *H04W 80/02* (2013.01)

(56) References Cited

U.S. PATENT DOCUMENTS

| | | | | |
|---|---|---|---|---|
| 2019/0053103 A1* | 2/2019 | Manolakos | | H04L 5/0051 |
| 2019/0053170 A1* | 2/2019 | Lee | | H04B 7/0617 |
| 2019/0103954 A1* | 4/2019 | Lee | | H04L 5/001 |
| 2019/0182870 A1* | 6/2019 | Shih | | H04W 74/004 |
| 2019/0191399 A1* | 6/2019 | Islam | | H04W 72/1268 |
| 2019/0208548 A1* | 7/2019 | Shih | | H04W 24/10 |
| 2019/0253986 A1* | 8/2019 | Jeon | | H04W 72/042 |
| 2019/0313438 A1* | 10/2019 | Zhang | | H04L 5/0094 |
| 2020/0059390 A1* | 2/2020 | Zhang | | H04L 1/0004 |
| 2020/0196285 A1* | 6/2020 | Zhuang | | H04L 5/0089 |
| 2020/0274678 A1* | 8/2020 | Lin | | H04W 72/1257 |
| 2020/0280423 A1* | 9/2020 | Tang | | H04L 5/0092 |
| 2020/0295907 A1* | 9/2020 | Li | | H04L 5/0092 |
| 2020/0374799 A1* | 11/2020 | Kuang | | H04L 5/0044 |
| 2021/0058964 A1* | 2/2021 | Hooli | | H04L 5/0062 |
| 2021/0068138 A1* | 3/2021 | Baldemair | | H04W 72/0446 |

OTHER PUBLICATIONS

ETSI, 5G; Study on Scenarios and Requirements for Next Generation Access Technologies (#GPP TR 38.913 version 14.2.0 Release 14), ETSI TR 138 913 v14.2.0, May 2017, pp. 1-41.

3GPP, 3rd Generation Partnership Project; Technical Specification Group Radio Access Network; NR; Medium Access Control (MAC) protocol specification (Release 15), 3GPP TS 38.321 V15.0.0, Dec. 2017, pp. 1-55.

PCT/IB2019/000543, "Notification of Transmittal of the International Search Report and the Written Opinion of the International Searching Authority, or the Declaration", PCT, datedOct. 10, 2019, pp. 1-12.

Mediatek Inc. "Offline discussion #110 [BWP switch and configured grant Type 1]", 3GPP TSG-RAN WG2 #101 bis R2-1806221, Apr. 16-20, 2018, pp. 1-4.

* cited by examiner

PROCEDURES FOR MULTIPLE ACTIVE BANDWIDTH PARTS

FIELD

The subject matter disclosed herein relates generally to wireless communications and more particularly relates to efficient management of multiple active bandwidth parts ("BWPs") and configured grants.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Bandwidth Part ("BWP"), Clear Channel Assessment ("CCA"), Cyclic Prefix ("CP"), Cyclical Redundancy Check ("CRC"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Licensed Assisted Access ("eLAA"), Enhanced Mobile Broadband ("eMBB"), Evolved Node B ("eNB"), European Telecommunications Standards Institute ("ET SI"), Frame Based Equipment ("FBE"), Frequency Division Duplex ("FDD"), Frequency Division Multiple Access ("FDMA"), Frequency Division Orthogonal Cover Code ("FD-OCC"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Radio Network Temporary Identifier ("RNTI"), Reference Signal ("RS"), Remaining Minimum System Information ("RMSI"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINK"), System Information Block ("SIB"), Synchronization Signal ("SS"), Supplementary Uplink ("SUL"), Transport Block ("TB"), Transport Block Size ("TBS"), Time-Division Duplex ("TDD"), Time Division Multiplex ("TDM"), Time Division Orthogonal Cover Code ("TD-OCC"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, such as 5G NR Release 15 ("Rel-15"), only one active bandwidth part ("BWP") at a time. Each BWP has an associated numerology, i.e. each BWP supports only one numerology. For cases when UE supports services requiring different numerologies, gNB needs to switch between different configured BWP(s). Although future releases may permit more than one active BWP, layer 2 procedures and related signaling are undefined for the case of multiple active BWPs.

BRIEF SUMMARY

Methods are disclosed for efficient management of multiple active BWPs. Apparatuses and systems also perform the functions of the methods. The methods may also be embodied in one or more computer program products comprising executable code.

A method for efficient management of multiple active BWPs includes communicating with a serving cell using multiple active BWPs for the serving cell. Here, the serving cell is configured with multiple configured grants, each active BWP configured with one of the multiple configured grants. The method includes receiving an indication from a base unit of which configured grants are to be used upon a change to the multiple active BWPs and selectively activating a configured grant in response to a change to the multiple active BWPs.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
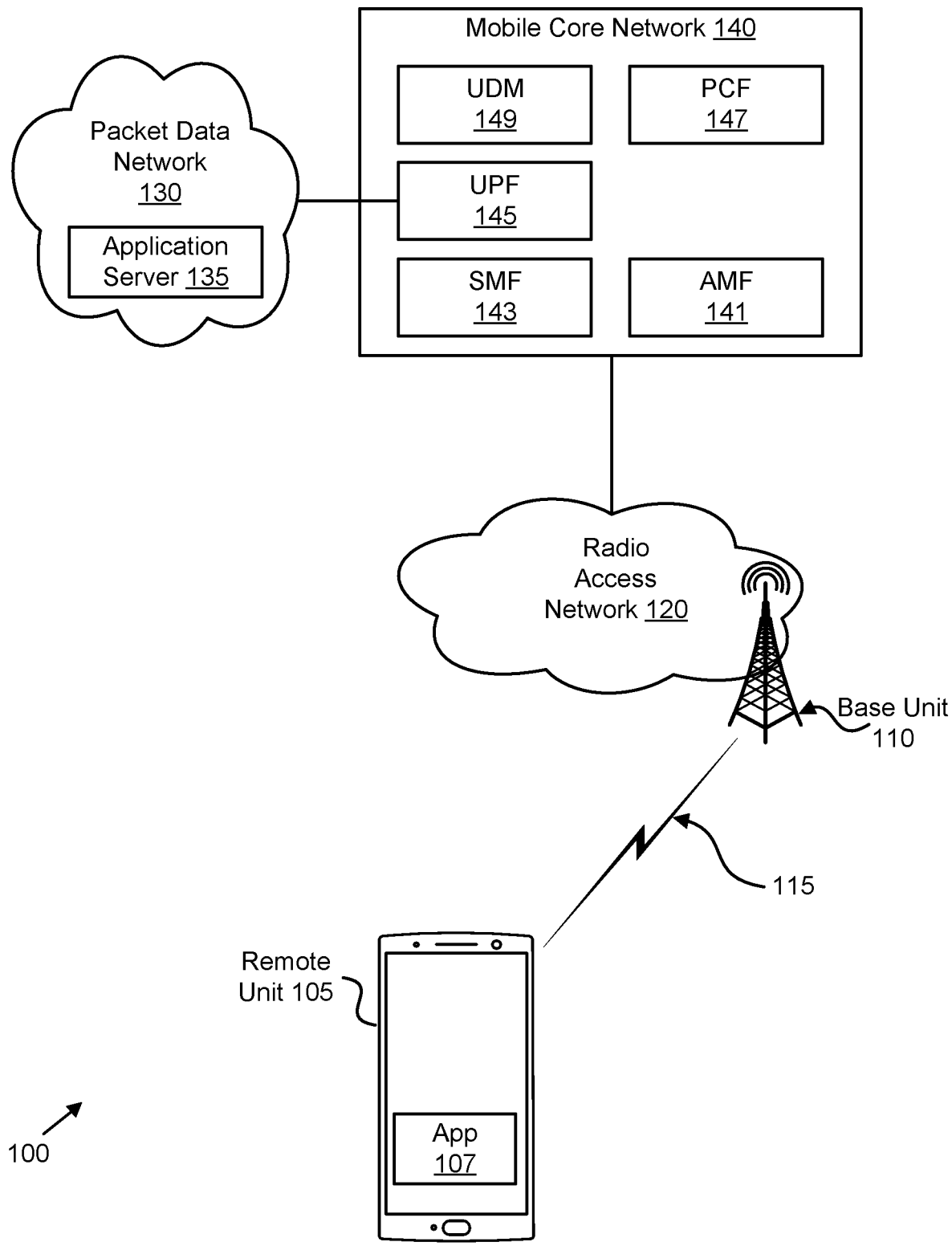
FIG. 1 is a schematic block diagram illustrating one embodiment of a wireless communication system for efficient management of multiple active BWPs.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for efficient management of multiple active BWPs. The various embodiments described herein applies generally to UL and DL transmissions. Said transmissions can include PUSCH, PDSCH, PUCCH, SRS, or PRACH transmissions. While some examples are described in terms of UL transmission, it should be noted that the embodiments are not limited to the UL direction only but may be also applied to DL operations, once the appropriate changes have been made. While the below description the term gNB may be used for a base station, it is to be understood that other base station or radio access nodes, e.g. BS, eNB, AP, etc., may be used. Further, the described procedures are described mainly in the context of NR (e.g., 3GPP fifth-generation radio access technology). However, the described procedures are also equally applicable to other mobile communication systems such as LTE, WiMAX, WLAN, and the like.

To support various requirements of different services (at least including enhanced mobile broadband ("eMBB), ultra-reliable low-latency communications ("URLLC"), massive machine type communication ("mMTC")), 5G/NR is envisioned to support different OFDM numerologies (i.e. subcarrier spacing ("SCS")) and CP length, in a single framework. As identified in TR 38.913, the various use cases/deployment scenarios for NR have diverse requirements in terms of data rates, latency, and coverage.

For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability (1-$10^{-5}$ within 1 ms). Finally, mMTC requires high connection density, large coverage in harsh environments, and extremely long-life battery for low cost devices.

Therefore, the OFDM numerology (e.g. subcarrier spacing, OFDM symbol duration, cyclic prefix (CP) duration, number of symbols per scheduling interval) that is suitable for one use case might not work well for another. For example, low-latency services may require a shorter symbol duration (and thus larger subcarrier spacing) and/or fewer symbols per scheduling interval (aka, TTI) than an mMTC service. Furthermore, deployment scenarios with large channel delay spreads require a longer CP duration than scenarios with short delay spreads. The subcarrier spacing should be optimized accordingly to retain the similar CP overhead.

In various embodiments, 5G/NR may support different numerologies across different carrier(s) for a given UE as well as different numerologies within the same carrier for a given UE, i.e. different OFDM numerologies are multiplexed in frequency-domain and/or time-domain within the same carrier or across different carriers. This benefits simultaneous support of services with vastly different requirements, e.g. ultra-low latency communications (short symbols and thus wide subcarrier spacing) and MBMS services (long symbols to enable long cyclic prefix and thus narrow subcarrier spacing).

In 5G/NR deployments, transmission and reception may include both centimeter- and millimeter-wave bands and higher frequency bands, e.g. from 6 GHz up to 70 GHz. Because (i) UE receive channel bandwidth can be smaller than the carrier bandwidth, (ii) non-contiguous spectrum may be used for one carrier, and (iii) multiple numerologies can be configured within one carrier, bandwidth parts (BWPs) based operation was developed in 5G NR. Each BWP consists of a group of contiguous physical resource blocks (PRBs) and is associated with a certain numerology (i.e., subcarrier spacing in OFDM operation) and/or service (e.g., eMBB or URLLC).

To enable Bandwidth adaption, i.e. adapting the size of the bandwidth used for data transmission in a serving cell, on the PCell, the gNB configures the UE with UL and DL Bandwidth Part(s) (BWP). To enable bandwidth adaptation on SCells for the case of carrier aggregation, the gNB configures the UE with at least DL BWP(s) (i.e. there may be none in the UL).

Each BWP consists of a group of contiguous physical resource blocks ("PRBs") and is associated with a certain numerology (e.g., subcarrier spacing in OFDM operation) and/or service (e.g., eMBB or URLLC). Some of the use-cases for BWPs are to support, e.g., reduced UE bandwidth capability; reduced UE energy consumption by means of bandwidth adaptation; frequency division multiplexing ("FDM") of different numerologies; and non-contiguous spectrum.

In BWP operation, a UE may be configured with one or multiple DL BWPs used for DL reception, and one or multiple UL BWPs used for UL transmission. For example, in 5G NR Release 15 ("Rel-15"), UE may be configured with up to four DL BWPs and up to four UL BWPs in a given serving cell. The configured DL and UL BWPs with the same BWP index for a serving cell are considered to have the same center frequency location in TDD operation, but may have distinct frequency locations in FDD operation (e.g., below 6 GHz) while not necessarily spaced at the frequency division duplex spacing.

An initial DL BPW is defined as the DL BWP of a serving cell (PCell, PSCell, and/or SCell) which corresponds to control resource set ("CORESET") for Type0-PDCCH common search space which is used for scheduling reception of the Remaining Minimum System Information ("RMSI"). An initial UL BWP is defined as the UL BWP of a primary serving cell (PCell or PSCell) on which at least initial random-access procedure occurs.

An active DL/UL BWP is defined as the DL/UL BWP on a serving cell on which data reception/transmission can occur. The active DL/UL BWP may be the same as the initial DL/UL BWP. As of 3GPP NR Rel-15, the UE is not expected to monitor or make measurements on any configured BWP other than the active DL/UL BWP.

The active DL/UL BWP can dynamically change. For example, a BWP indicator field in downlink control information ("DCI") for DL-assignment/UL-grant may be used to indicate which of the configured DL/UL BWPs are currently active for DL reception/UL transmission. If the active DL BWP has been unused (e.g., no DCI has been received on that DL BWP) for a long time, then the UE may fall back to a so-called default DL BWP, which is either the initial DL BWP or another DL BWP (e.g., configured by higher-layers).

In paired spectrum, DL and UL can switch BWP independently. In unpaired spectrum, DL and UL switch BWP simultaneously. Switching between configured BWPs happens by means of a DCI, i.e. PDCCH indicating to switch to another Bandwidth part, or inactivity timer. When an inactivity timer is configured for a serving cell, the expiry of the inactivity timer associated to that cell switches the active BWP to a default BWP configured by the network. Switching refers to activating one or more BWP and deactivating an equal number of BWP.

In 3GPP Rel-15, a Serving Cell may be configured with at most four BWPs, and for an activated Serving Cell, there is always one active BWP at any point in time. The BWP switching for a Serving Cell is used to activate an inactive BWP and deactivate an active BWP at a time and is controlled by the PDCCH indicating a downlink assignment or an uplink grant. Upon addition of SpCell or activation of an SCell, one BWP is initially active without receiving PDCCH indicating a downlink assignment or an uplink grant. This BWP may be referred to as an initial BWP.

On the active BWP for each activated Serving Cell configured with a BWP, the medium access control ("MAC") entity applies normal operations including: 1) transmit on UL-SCH; 2) transmit on RACH; 3) monitor the PDCCH; 4) transmit PUCCH; 5) receive DL-SCH; and 6) (re-)initialize any suspended configured uplink grants of configured grant Type 1 according to the stored configuration On the inactive BWP for each activated Serving Cell configured with a BWP, the MAC entity: 1) does not transmit on UL-SCH; 2) does not transmit on RACH; 3) does not monitor the PDCCH; 4) does not transmit PUCCH; 5) does not receive DL-SCH; 6) clears any configured downlink assignment and configured uplink grant of configured grant Type 2; and 7) suspends any configured uplink grant of configured Type 1.

If the active UL BWP has no PRACH resources configured, the UE, upon triggering of a RACH procedure, switches to the initial DL BWP and UL BWP and performs RACH procedure. If the MAC entity receives a PDCCH for BWP switching while a Random-Access procedure is ongoing in the MAC entity, it is up to UE implementation whether to switch BWP or ignore the PDCCH for BWP switching. If the MAC entity decides to perform BWP switching, the MAC entity stops the ongoing Random-Access procedure and initiate a Random-Access procedure on the new activated BWP. If the MAC decides to ignore the PDCCH for BWP switching, the MAC entity continues with the ongoing Random-Access procedure on the active BWP.

As mentioned before, 3 GPP Rel-15 allows only one active BWP at a time. Each BWP has an associated numerology, i.e. each BWP supports only one numerology. For cases when UE supports services requiring different numerologies, in Rel-15 the gNB needs to switch between different configured BWP(s). In order to support QoS more efficiently, in particular for scenarios where a UE has services/radio bearer running requiring different numerologies, it is envisioned that it will be possible to have multiple BWP(s) activated simultaneously in future releases.

The present disclosure describes several layer 2 procedures and related signaling details in the context of multiple activated BWPs. Specifically, the following procedures are disclosed for supporting multiple active BWP(s) in a serving cell: Logical channel prioritization/restriction procedure; Uplink power control operation; Pathloss reference determination; Configured grants; HARQ protocol operation; Maintenance of BWP(s) for UEs in INACTIVE state; Maintenance of Uplink Time Alignment; and Monitoring of Common Search Space.

FIG. 1 depicts a wireless communication system 100 for UE power control for multiple UL carriers, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 110 with which the remote unit 105 communicates using wireless communication links 115. Even though a specific number of remote units 105, base units 110, wireless communication links 115, RANs 120, and mobile core networks 140 are depicted in FIG. 1, one of skill in the art will recognize that any number of remote units 105, base units 110, wireless communication links 115, RANs 120, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 110 in the RAN 120 via uplink ("UL") and downlink ("DL") communication signals. Furthermore, the UL and DL communication signals may be carried over the wireless communication links 115. Here, the RAN 120 is an intermediate network that provides the remote units 105 with access to the mobile core network 140.

In some embodiments, the remote units 105 communicate with an application server 135 via a network connection with the mobile core network 140. For example, an application 107 (e.g., web browser, media client, telephone/VoIP application) in a remote unit 105 may trigger the remote unit 105 to establish a PDU session (or other data connection) with the mobile core network 140 via the RAN 120. The mobile core network 140 then relays traffic between the remote unit 105 and the application server 135 in the packet data network 130 using the PDU session. Note that the remote unit 105 may establish one or more PDU sessions (or other data connections) with the mobile core network 140. As such, the remote unit 105 may concurrently have at least one PDU session for communicating with the packet data network 130 and at least one PDU session for communicating with another data network (not shown).

The base units 110 may be distributed over a geographic region. In certain embodiments, a base unit 110 may also be referred to as an access terminal, an access point, a base, a base station, a Node-B, an eNB, a gNB, a Home Node-B, a relay node, or by any other terminology used in the art. The base units 110 are generally part of a radio access network ("RAN"), such as the RAN 120, that may include one or more controllers communicably coupled to one or more corresponding base units 110. These and other elements of radio access network are not illustrated but are well known generally by those having ordinary skill in the art. The base units 110 connect to the mobile core network 140 via the RAN 120.

The base units 110 may serve a number of remote units 105 within a serving area, for example, a cell or a cell sector, via a wireless communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 140 is a 5G core ("5GC") or the evolved packet core ("EPC"), which may be coupled to a packet data network 130, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs") 145. The mobile core network 140 also includes multiple control plane functions including, but not limited to, an Access and Mobility Management Function ("AMF") 141 that serves the RAN 120, a Session Management Function ("SMF") 143, and a Policy Control Function ("PCF") 147. In certain embodiments, the mobile core network 140 may also include an Authentication Server Function ("AUSF"), a Unified Data Management function ("UDM") 149, a Network Repository Function ("NRF") (used by the various NFs to discover and communicate with each other over APIs), or other NFs defined for the 5GC.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like. In certain embodiments, the mobile core network 140 may include a AAA server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. In certain embodiments, the various network slices may include separate instances of network functions, such as the SMF 143 and UPF 145. In some embodiments, the different network slices may share some common network functions, such as the AMF 141. The different network slices are not shown in FIG. 1 for ease of illustration, but their support is assumed.

While FIG. 1 depicts components of a 5G RAN and a 5G core network, the described embodiments for UE power control for multiple UL carriers apply to other types of communication networks, including IEEE 802.11 variants, UMTS, LTE variants, CDMA 2000, Bluetooth, and the like. For example, in an LTE/EPC variant, the AMF 141 may be mapped to an MME, the SMF 143 may be mapped to a control plane portion of a PGW, the UPF 145 may be mapped to a STW and a user plane portion of the PGW, etc.

The remote unit 105 may be configured for BWP operation by the base unit 110. AS described above, the remote unit 105 may be configured with multiple BWP on both the UL and DL. In various embodiments, the remote unit 105 may perform uplink transmission on one or multiple active UL BWPs using the procedures described herein. Additionally, the remote unit 105 may perform DL reception on one or multiple active DL BWPs using the procedures described herein. The UL and DL transmissions may include PUSCH, PDSCH, PUCCH, SRS, or PRACH transmissions.

Figure 2:
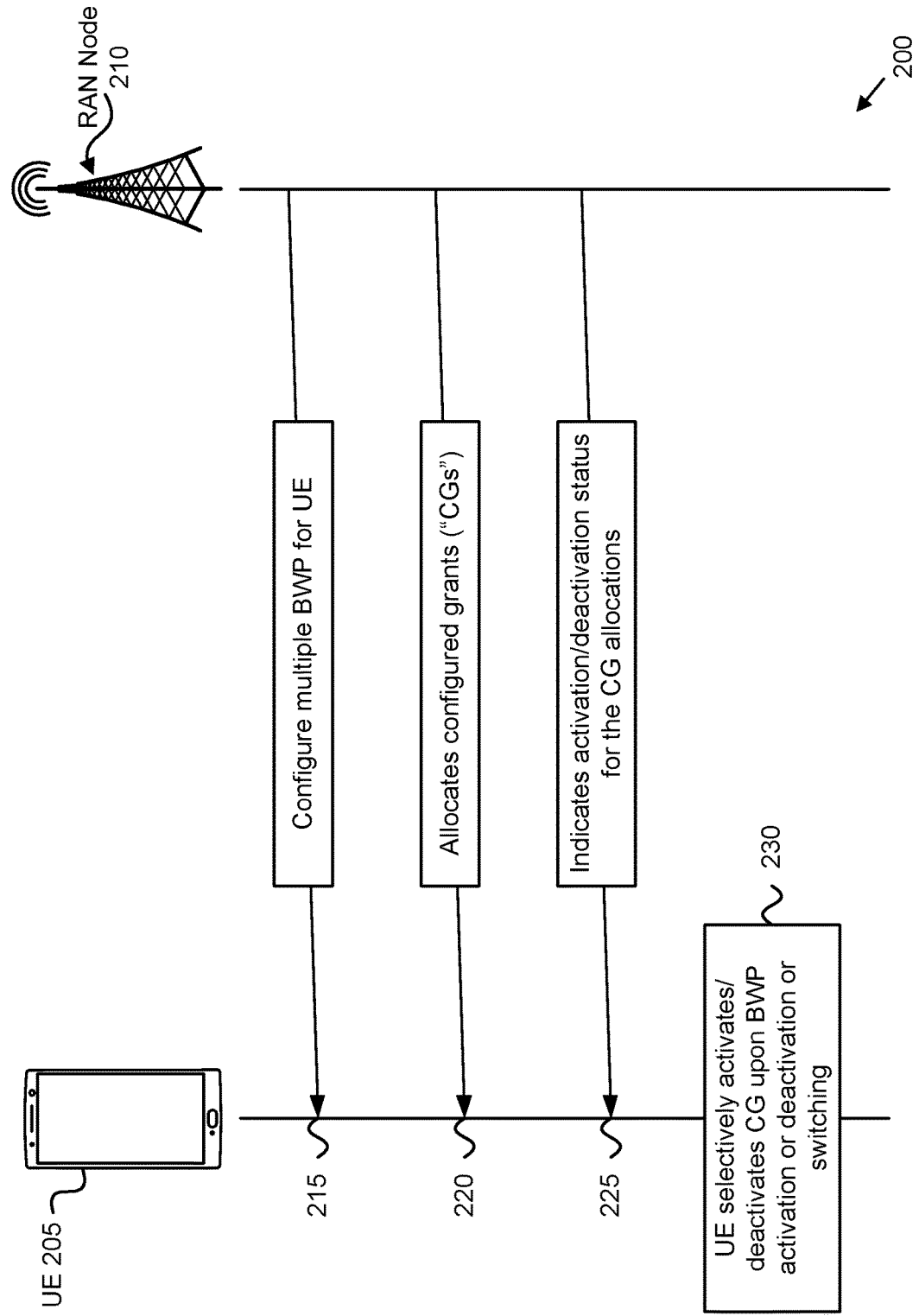
FIG. 2 is a block diagram illustrating one embodiment of a network architecture for managing configured grants with multiple BWPs.

FIG. 2 depicts a network architecture 200 for efficient management of multiple active BWPs, according to embodiments of the disclosure. The network architecture 200 includes a UE 205 and a RAN Node 210. The UE 205 may be one embodiment of the remote unit 105, described above. The RAN Node 210 (e.g., a gNB) may be one embodiment of the base unit 110, described above.

As depicted, the RAN Node 210 may configure the UE 205 with multiple UL BWP (see messaging 215). Additionally, the RAN Node 210 may configure one or more configured grants (e.g., semi-static grants) (see messaging 220). There are two types of transmission without dynamic grant defined for NR: Type 1 and Type 2. With configured grant Type 1, an uplink grant is provided by RRC and stored as configured uplink grant. With configured grant Type 2, an uplink grant is provided by PDCCH, and stored (or cleared) as configured uplink grant based on L1 signaling indicating configured grant activation or deactivation.

Type 1 and Type 2 configured grants (e.g., semi-static grants) may be configured by RRC per Serving Cell and per BWP. In some embodiments, multiple configurations may be active simultaneously only on different Serving Cells. For Type 2 grants, activation and deactivation may be independent among the Serving Cells. For the same Serving Cell, the MAC entity may be configured with either a Type 1 grant or Type 2 grant. While following descriptions are refer mostly to configured grant Type 1, in various embodiments, the configured uplink grant may be Type 2.

In order to allow service continuity when switching BWPs, the RAN Node 210 configures on all configured BWPs of a UE (e.g., a remote unit 105) the same configured grant allocation, thus the same periodicity, same timeDomainOffset parameter (Offset of a resource with respect to SFN=0 in time domain), etc. Beneficially, in case of BWP switching, the configured grant is implicitly activated on the newly activated BWP and logical channels ("LCHs") configured for the configured grant can use the allocated resources.

In various embodiments, it may be desirable to avoid the situation that multiple configured grant ("CG") configurations are active at the same time. Assuming that UE supports only one active configured grant ("CG") configuration per serving cell and the same CG configuration may be used for all configured BWP(s) in a serving cell. Accordingly, the RAN Node 210 (a network entity "NE," such as gNB, base unit 110, or other suitable base station) indicates an activation/deactivation status for the CG allocations (see messaging 225). The UE 205 then selectively activate (or deactivates) the CG allocations upon BWP activation, deactivation, or switching (see block 230).

According to some embodiments, the RAN Node 210 explicitly signals which of the configured grant allocations (e.g. configured grant type 1 allocations) configured for the different BWP(s) of a serving cell is activated and, respectively, which are deactivated. In certain embodiments, MAC control signaling is used for such an indication, i.e., signaling the activation/deactivation status of a CG. In one embodiment, a new MAC control element ("CE") is introduced which contains a bitmap, each bit of the bitmap representing the activation/deactivation status of a configured grant allocation. According to one implementation, a bit of the bitmap set to '1' indicates the UE is to activate the corresponding configured grant allocation while a bit of the bitmap set to '0' indicates the UE is to deactivate the corresponding configured grant allocation. In certain embodiments, the MAC CE indicates the activation/deactivation status of the configured grant(s) for the BWP(s) configured for a serving cell. In a further embodiment, the MAC CE may contain a serving cell identifier field identifying the serving cell for which the configured grant(s) activation/deactivation status represented by the bitmap is signaled.

In various embodiments, the activation/deactivation indication of a configured grant allocation is signaled together with the activation/deactivation/switching signaling of the corresponding BWP. In one embodiment the RAN Node 210, such as gNB or base unit 110, indicates to the UE 205 whether it is to activate the corresponding configured grant (if configured) when activating a BWP. Here, activating the corresponding configured grant may include initializing (or re-initializing) any suspended configured uplink grant(s) of configured grant Type 1 according to the stored configuration.

In some embodiments, the activation/deactivation status of a configured grant may be represented by a one-bit flag within the activation/deactivation/switching BWP signaling. According to one implementation, setting the one-bit flag set '1' directs the UE to activate the corresponding configured grant (if configured), e.g., (re-)initialize the suspended configured uplink grant(s) of configured grant Type 1 according to the stored configuration. In certain embodiments, said BWP activation/deactivation/switching signaling may be done by physical layer signaling (e.g., within a DCI) or MAC signaling (e.g., MAC CE).

According to various embodiments, there may be multiple configured grant(s) in a serving cell active at the same time. In certain embodiments, the RAN Node 210 signals the activation/deactivation status of a configured grant (e.g., type 1 CG) configured for a serving cell, e.g., on a BWP configured for a serving cell. In one implementation, the activation/deactivation status of a configured grant is signaled by means of a bitmap, each bit of the bitmap representing the activation/deactivation of one configured grant of the serving cell.

Figure 3:
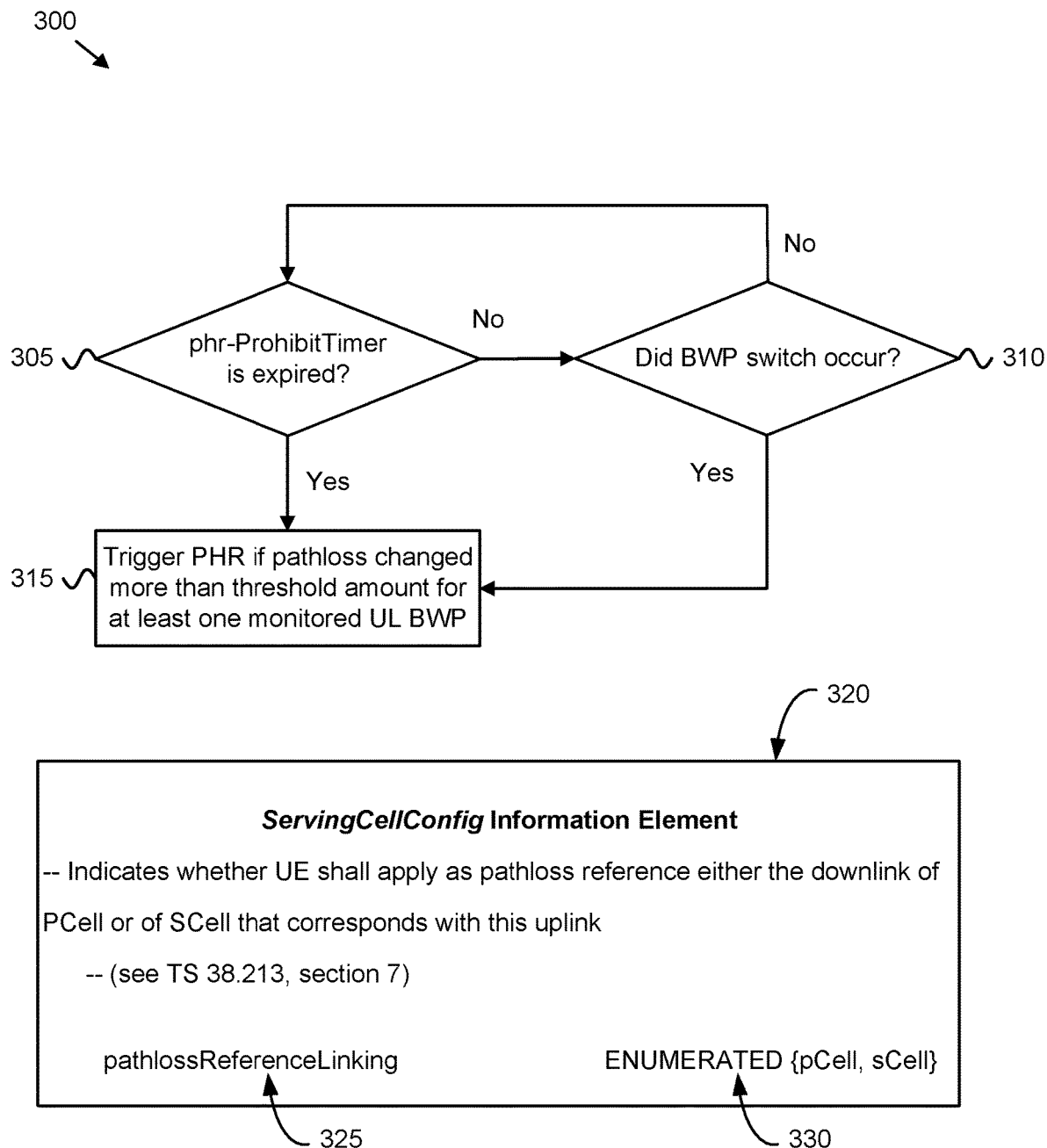
FIG. 3 is a block diagram illustrating one embodiment of triggering PHR for multiple BWPs.

FIG. 3 depicts a procedure 300 for UE power control for multiple UL carriers, according to embodiments of the disclosure. The procedure 300 may be performed by a UE, such as the remote unit 105 and/or the UE 205. Here, the UE is configured with multiple BWPs for a UL carrier (e.g., of a serving cell).

The procedure 300 begins as the UE monitors a power headroom reporting timer, such as 'phr-ProhibitTimer', to determine whether the timer is expired (see decision block 305). If the timer expires, then the UE triggers a PHR if a pathloss has changed more than a threshold amount (e.g., indicated by phr-Tx-PowerFactorChange parameter) for at least one monitored UL BWP (see block 315). Additionally, the UE monitors for a switch in BWP (see decision block 310). If a BWP switch occurs, then the UE triggers a PHR if a pathloss has changed more than a threshold amount (e.g., indicated by phr-Tx-PowerFactorChange parameter) for at least one monitored UL BWP (see block 315).

Fifth-generation ("5G") mobile networks may implement various power control ("PC") and power headroom ("PH") formulas that involve some aspects of BWP operation. In particular, many PC parameters are configured per UL BWP, including, but not limited to, the UE-specific component of target power spectral density ("PSD") value Po_UE, the fractional pathloss ("PL") compensation factor α, the PL reference, the closed-loop power control ("CL-PC") process, and the transmission bandwidth (i.e., number of PRBs) allocation.

A power headroom report ("PHR") is triggered, and subsequently sent, when certain trigger conditions are met. One of those trigger conditions is related to a change in the pathloss, i.e. the path loss has changed more than phr-Tx-PowerFactorChange dB since the last transmission of a PHR in this MAC entity. In one embodiment, pathloss trigger condition is checked by the UE 205 for every active UL BWP or a subset of the active UL BWP(s), the subset being, e.g., configured by the RAN node 210.

According to certain embodiments, a PHR may be triggered 315 when the phr-ProhibitTimer expires (or has expired, refer to decision block 305) and the path loss has changed more than phr-Tx-PowerFactorChange dB for at least one active UL BWP of a serving cell. Alternatively, a PHR may be triggered when the phr-ProhibitTimer expires (or has expired, see decision 305) and the path loss has changed more thanphr-Tx-PowerFactorChange dB for at least one active UL BWP of the subset of active UL BWP(s) of any MAC entity which is used as a pathloss reference since the last transmission of a PHR in this MAC entity when the MAC entity has UL resources for new transmission.

In certain embodiments, when deactivating an active BWP and activating another BWP in a serving cell at the same time, referred to herein as BWP "switching", the UE 205 checks the PHR pathloss trigger condition across the BWP switch (refer to decision block 310). In other words, the UE 205 may compare pathloss measurements done on the old BWP with pathloss measurements on the newly activated BWP (after switching) and trigger a PHR when pathloss has changed more than phr-Tx-PowerFactorChange dB between the old BWP and new BWP.

In one embodiment, the UE 205 is not required to report PH information for an active (UL) BWP in case the BWP was activated after the UE 205 started the generation of the TB containing the PHR MAC CE. The assumption here is that the UE 205 reports PH information for every activated UL BWP in a serving cell. However, due to processing timing constraints, the UE 205 may not be able to calculate/report the power headroom level for an activated UL BWP in a situation where the control signaling activating said UL BWP is received after the time instance where the UE 205 received an UL grant for an initial PUSCH transmission, the PUSCH transmission carrying a PHR MAC CE.

Power control and power headroom formulas that involve some aspects of BWP operation have been adopted for 5G operation. For example, if a UE transmits a PUSCH on UL BWP b of UL carrier f of serving cell c using parameter set configuration with index j and PUSCH power control adjustment state with index l, the UE determines the PUSCH transmission power $P_{PUSCH,b,f,c}(i,j,q_d,l)$ in PUSCH transmission occasion i as Equation 1

$$P_{PUSCH,b,f,c}(i, j, q_d, l) = \min\left\{ \begin{matrix} P_{CMAX,f,c}(i), \\ P_{O\_PUSCH,b,f,c}(j) + 10\log_{10}(2^\mu \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i, l) \end{matrix} \right\}$$

where the PUSCH transmission power of Equation 1 is in [dBm], where all parameters in the calculation are defined in 3GPP TS 38.213 (ver. 15.0.0), which is incorporated herein by reference.

Many PC parameters are configured per UL BWP, including: the UE-specific component of target power spectral density ("PSD") value 'P0_UE', the fractional pathloss compensation factor α, the pathloss ("PL") reference, the closed-loop power control ("CL-PC") process, and the transmission bandwidth (e.g., number of PRBs) allocation. However, the configured maximum UE transmit power, '$P_{CMAX}$, f,c,' may be configured per UL carrier of a serving cell, without regard to the choice of UL BWP.

Furthermore, the UE 205 may be configured with some pathlossReferenceLinking parameter 325, for example as depicted in the ServingCellConfig Information Element 320. The value 330 of the pathlossReferenceLinking parameter 325 indicates whether the UE 205 is to use either the downlink PCell or the downlink SCell as the pathloss reference serving cell.

According to one embodiment, the UE 205 uses the reference signal ("RS") index $q_d$ of the current active UL BWP of the reference serving cell (either PCell or corresponding SCell) for calculating the pathloss estimate. For example, if the pathlossReferenceLinking is set to Pcell for a serving cell of the UE 205, then the UE 205 uses the RS index $q_d$ of the current active UL BWP of the PCell for pathloss estimates used in this serving cell for power control related operations such as e.g. determination of transmission for UL transmission (e.g., PUSCH, PUCCH, or SRS). For example, in case the pathlossReferenceLinking IE is set to 'PCell' for an SCell of the UE 205, e.g., uses for the determination of the PUSCH transmission power or for the calculation of a PHR for this SCell the PUSCH-Pathloss-ReferenceRS of the current active UL BWP of PCell.

In another embodiment, the UE 205 uses the RS index $q_d$ of the current active DL BWP of the reference serving cell (either PCell or corresponding SCell) for calculating the pathloss estimate. For example in case the pathlossReferenceLinking is set to PCell for a serving cell of the UE 205, the UE 205 uses the RS index $q_d$ of the current active DL BWP of the PCell for pathloss estimates used in this serving cell for power control related operations such as e.g. determination of transmission for PUSCH/PUCCH/SRS. For example, in case the pathlossReferenceLinking IE is set to PCell for an SCell of the UE 205, the UE 205 may then use the PUSCH-PathlossReferenceRS of the current active DL BWP of PCell for the determination of the PUSCH transmission power or for the calculation of a PHR for this SCell, i.e., paired DL BWP is the current active DL BWP.

For cases when there are more than one active DL/UL BWP(s) in a serving cell, several possibilities exist for which of the current active UL/DL BWPs of the pathloss reference serving cell (DL PCell, corresponding SCell DL) the UE 205 is to use the RS index $q_d$ for the estimation of the path-loss. In some embodiments, the UE 205 selects a DL BWP that is linked (or paired) to the UL BWP b and then calculates the downlink path-loss estimate using RS index $q_d$ of the selected DL BWP.

In one example, the linked/paired DL BWP b for which a downlink path-loss estimate is calculated is the initial DL BWP within the reference serving cell, i.e., DL PCell or corresponding DL SCell.

In one example, the linked/paired DL BWP b for which a downlink path-loss estimate is calculated is the default DL BWP within the reference serving cell (either DL PCell or corresponding DL SCell). Note that in one embodiment the default DL BWP is the same as the initial DL BWP. In other embodiments, the default DL BWP is a different DL BWP than the initial DL BWP.

In certain embodiments, there may be an explicit linking or implicit linking (e.g., UL BWP and DL BWP with the same BWP index are linked) between a DL BWP and UL BWP for the pathloss estimate, i.e., in case the UE 205 needs to estimate the pathloss for a power control related operation for uplink BWP b, e.g., determination of PUSCH TX power, the pathloss Reference signals (RS) indicated by the RS index $q_d$ of the linked DL BWP in the reference serving cell (either PCell or SCell) are used for the pathloss estimation. Such explicit linking/pairing may be according to certain embodiments configured by higher layer signaling.

In one example, the linked/paired DL BWP b for which a downlink path-loss estimate is calculated is the DL BWP with a predefined BWPindex, i.e. BWP with BWPindex=0.

In one example, the linked/paired DL BWP b for which a downlink path-loss estimate is calculated is the active DL BWP in the reference serving cell with the lowest BWPindex (among the active DL BWPs in the reference serving cell).

According to one embodiment, the UE 205 releases all dedicated BWPs configured for a serving cell except one BWP, e.g. the initial BWP or alternatively the default BWP, when being directed to the Inactive state from the NR. Alternatively, and according to another embodiment, the UE 205 deactivates all configured BWP(s) of a serving cell except one BWP, e.g. the initial BWP or alternatively the default BWP, when being directed to the Inactive state from the NR. Here, the resume procedure may only take place on the initial or default BWP, e.g., the UE 205 performing RACH procedure for resuming to either RRC connected state or data transmission without transiting to RRC connected state.

Figure 4:
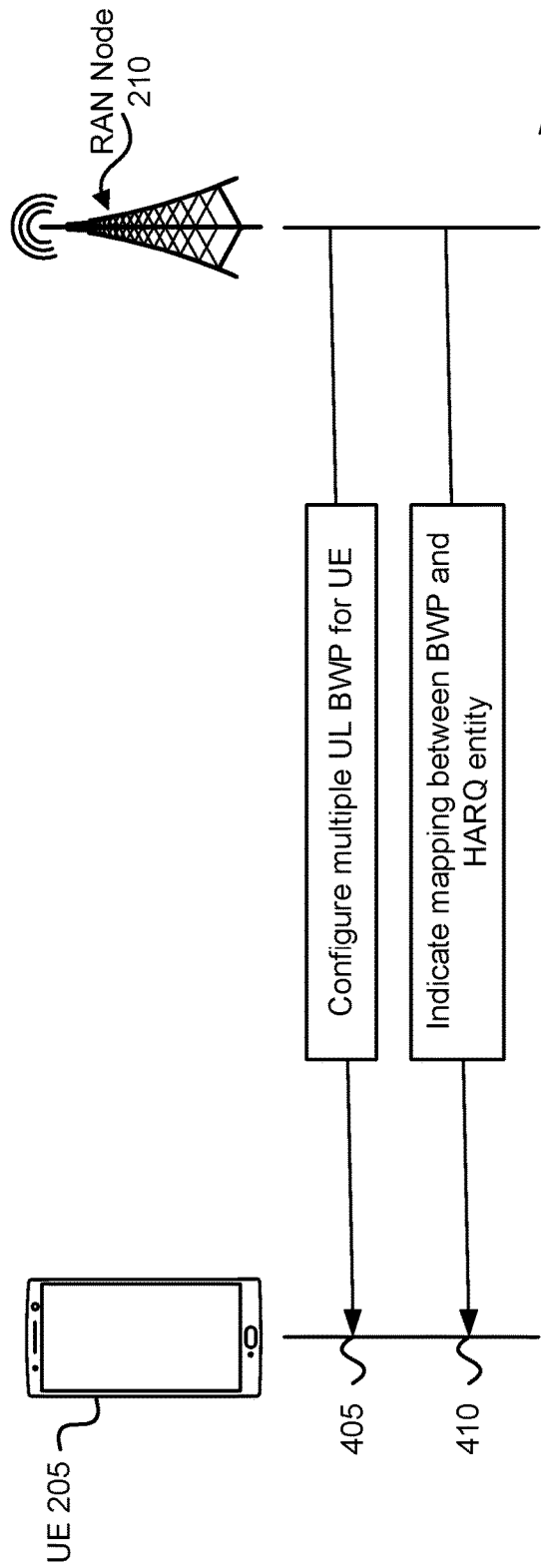
FIG. 4 is a block diagram illustrating one embodiment of a network architecture for mapping a BWP to a HARQ process.

FIG. 4 depicts a network architecture 400 for efficient management of multiple active BWPs, according to embodiments of the disclosure. The network architecture 400 includes the UE 205 and the RAN Node 210. As depicted, the RAN Node 210 may configure the UE 205 with multiple UL BWP for a serving cell (see messaging 405). Additionally, the RAN Node 210 may indicate a BWP-to-HARQ entity mapping (see messaging 410), as discussed in further detail below.

In various embodiments, the MAC entity on the UE 205 may include one HARQ entity for each active BWP of a serving cell. This ensures parallel HARQ operation within and across all active BWPs, i.e., each active BWP is operated independently. In certain embodiments, a MAC entity may include one HARQ entity per serving cell (including the case where a supplemental UL carrier is configured for a serving cell), because Rel-15 supports only one active BWP at a time per serving cell. Here, each HARQ entity maintains a number of parallel HARQ processes. In one embodiment, the number of parallel HARQ processes per HARQ entity may be fixed by industry standard (e.g., 3GPP specification).

In some embodiments, one HARQ entity may be shared by more than one (active) BWP(s) of a serving cell. Here, the HARQ processes of the HARQ entity are used for transmissions/receptions on the more than one active BWP(s). In one embodiment, the RAN Node 210 configures and signals the mapping between BWP and HARQ entity. According to certain embodiments, this mapping between BWP and HARQ entity may be different for DL and UL HARQ protocol operation. In an alternative embodiment, the DCI, i.e. DL or UL grant, contains a HARQ entity ID in addition to the HARQ process ID. The DCI based signaling would obviate the mapping configuration between BWP and HARQ entity.

In other embodiments, the MAC entity may include one HARQ entity for all BWP(s) of a serving cell, even for the case that multiple BWPs are active at the same time. In such embodiments, number of HARQ processes of the HARQ entity may be increased compared to Rel-15, where only one BWP can be active at one time. Here, the HARQ processes can be used for transmission/receptions across all active BWPs. In one embodiment a HARQ (re)transmission of the same TB may occur on different BWPs. For example, an initial transmission for HARQ process ID=1 may be scheduled on BWP ID=1, whereas the retransmission for HARQ process ID=1 may be scheduled on BWP ID=2.

In one embodiment, when the RAN Node 210 switches a BWP, i.e. signals the UE 205 to activate an inactive BWP and deactivate an active BWP at the same time, the HARQ protocol operation continues across the two BWPs. For example, the HARQ protocol states and HARQ buffer remains the same (e.g., is not changed) upon the BWP switch. In another embodiment, the UE 205 resets the HARQ protocol operation in response to a BWP switch. For example, the UE 205 may flush the HARQ buffer and re-initialize the HARQ protocol states/timers upon the BWP switch. In certain embodiments, the control signaling indicating a BWP switch (e.g. DCI) contains a field indicating whether the HARQ buffer should be flushed and/or HARQ protocol reset/initialization should be applied.

Figure 5:
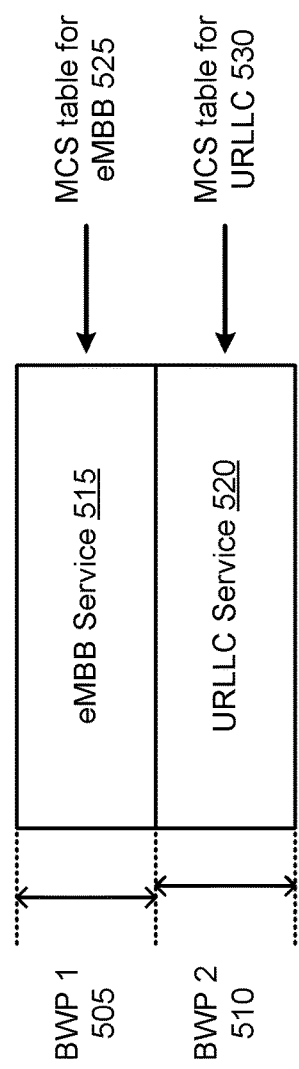
FIG. 5 is a block diagram illustrating one embodiment of MCS tables for efficient management of multiple active BWPs.

As mentioned above, one motivation for activating multiple BWPs at the same time is to support multiple numerologies, thereby supporting different services like eMBB and URLLC being operated on different BWPs simultaneously. FIG. 5 depicts one example 500 of different services being operated on different BWPs simultaneously. Here, a first BWP 505 supports a first service (depicted here as eMBB service 515) and a second BWP 510 supports a second service (depicted here as URLLC service 520). Moreover, each service is associated with an MCS table, specifically a first MCS table 525 for the eMBB service 515, and a second MCS table 530 for the URLLC service 520.

As depicted, a different MCS table (e.g., used to achieve a BLER operation point) may be used for URLLC than for eMBB, due to the different natures of the services. Note that the focus of current URLLC development is on latency of the service. One option of operating multiple active BWPs is to associate specific services with BWPs, such that eMBB and URLLC services are not supported in the same BWP, as depicted in FIG. 5. If the current restriction parameters (SCS, maximum PUSCH duration, configured grant type 1, and allowed cells) used in the LCP procedure are not enough to distinguish a URLLC and eMBB grant, then according to one embodiment, a mapping between LCH and BWP may be used introduced. Here, only certain LCH may be allowed to use UL resources on a specific BWP, as defined via the mapping. During LCP procedure, this further restriction (the mapping restriction between LCH and BWP) is to be considered by the UE 205.

For the case of having multiple active BWPs, duplication may be supported by using two BWPs of a serving cell. In certain embodiments, the two BWPs are far away from each other in the serving cell's frequency band, e.g., at the outer edges of the serving cell. This would also allow performing duplication in a non-CA case. Moreover, the RAN Node 210 may configure the BWP restriction for a duplication bearer, i.e. bearer which is configured for duplication. Additionally, the RAN Node 210 may configure which BWP(s) are allowed for the LCHs used for a duplication radio bearer.

In case of having multiple active BWPs, it may happen that the UE 205 is configured with multiple CSS, i.e. there may be one CSS per BWP. In such embodiments, the UE 205 may be configured to only monitor one CSS. Moreover, the UE 205 may be configured with a rule or policy as to which CSS the UE 205 is to monitor. For example, the UE 205 may be configured to monitor only the CSS associated with a primary BWP. In one embodiment, the network (e.g., via RAN Node 210) configures the UE 205 to monitor only a single CSS. In another embodiment, the UE 205 may be preconfigured with the rule/policy indicating which CSS the UE 205 is to monitor.

In NR, a UE 205 may be configured with up to 4 UL BWP(s) for a serving cell. The BWP concept allows for power savings in the UE 205 by adapting the RX/TX bandwidth. Because each BWP is associated with one OFDM numerology (e.g., subcarrier spacing ("SCS")), different BWP(s) within a carrier/serving cell may use a different timing advance ("TA") granularity depending on the associated SCS. Given a certain OFDM numerology, the RAN Node 210 may maintain the TA granularity significantly finer than the length of the corresponding CP length. Because the CP length in different numerology is scaled with the 15 kHz case, the scaled timing advance granularity may be used for different numerology.

According to one embodiment, different BWPs of a serving cell may be associated with a different TA group ("TAG"). In various embodiments, different BWP(s) of a serving cell are associated with different TRPs, which in turn means that uplink transmissions on different BWPs of a serving cell may require a different timing alignment value. When the UE 205 is scheduled for an uplink transmission on a certain UL BWP of a serving cell, the UE 205 is to use the timing advance value associated with this BWP. A UE 205 may have to maintain multiple TA loops for one serving cell, i.e. for each TAG associated with a BWP of a serving cell, UE 205 has to maintain a TA process/loop.

Figure 6:
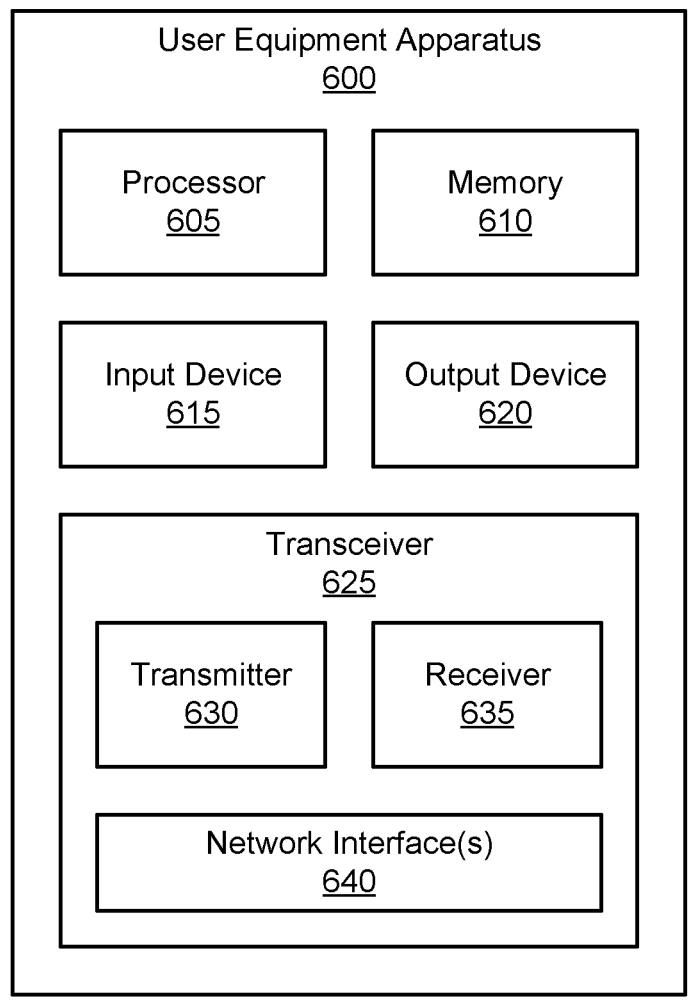
FIG. 6 is a block diagram illustrating a user equipment apparatus for efficient management of multiple active BWPs.

FIG. 6 depicts a user equipment apparatus 600 that may be used for UE power control for multiple UL carriers, according to embodiments of the disclosure. The user equipment apparatus 600 may be one embodiment of the remote unit 105, described above. Furthermore, the user equipment apparatus 600 may include a processor 605, a memory 610, an input device 615, an output device 620, a transceiver 625 for communicating with one or more base units 110.

As depicted, the transceiver 625 may include a transmitter 630 and a receiver 635. The transceiver 625 may also support one or more network interfaces 640, such as the Uu interface used to communicate with a gNB, or another suitable interface for communicating with the RAN 120. In various embodiments, the transceiver 625 receives configuration of a plurality of uplink carriers for a serving cell. In some embodiments, the transceiver 625 receives configuration of a first number of uplink carriers of the plurality of uplink carriers, the first number of uplink carriers corresponding to a first number of configured and active uplink bandwidth parts of a first uplink carrier of the serving cell.

In some embodiments, the input device 615 and the output device 620 are combined into a single device, such as a touchscreen. In certain embodiments, the user equipment apparatus 600 may not include any input device 615 and/or output device 620.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the transceiver 625 communicates with a serving cell using multiple active BWPs for the serving cell. Here, the serving cell may be configured with multiple configured grants, each active BWP configured with one of the multiple configured grants. In certain embodiments, a number of active BWPs is greater than a number of activated configured grants.

In certain embodiments, the multiple active BWPs are selected from a set of configured BWPs of the serving cell. In such embodiments, the processor 605 may map one or more logical channels to each of the multiple configured BWPs and prioritizing data from the logical channels for transmission on an uplink BWP. In some embodiments, the user equipment apparatus 600 supports a plurality of services, each service associated with a different active BWP.

The processor 605 receives (e.g., via the transceiver 625) an indication from a base unit (e.g., base unit 110 and/or RAN node 210) of which configured grants are to be used upon a change to the multiple active BWPs. In some embodiments, the indication is received in a MAC CE. In such embodiments, the MAC CE may include a bitmap. Here, each bit of the bitmap may indicate whether a configured grant is to be activated or deactivated.

In some embodiments, the transceiver 625 receives an indication to switch an active BWP, wherein the indication to switch an active BWP and the indication of which configured grants are to be used are included in the same message.

In response to change to the multiple active BWPs, the processor 605 selectively activates (and/or selectively deactivates) one or more of the multiple configured grants (e.g., based on the indication). In various embodiments, the change to the multiple active BWPs is the activation of a BWP, the deactivation of a BWP, or the switching of an active BWP of the serving cell. In some embodiments, the transceiver 625 receives an indication to transition to an inactive state. In such embodiments, the processor 605 deactivates all active BWPs of the serving cell except a single BWP, the single BWP being one of an initial BWP and a default BWP.

In certain embodiments, the change to the multiple active BWPs comprises switching a first BWP for a second BWP. In such embodiments, the processor 605 may continue HARQ protocol operation across the first and second BWPs. In certain embodiments, different ones of the active BWPs are associated with different timing advance groups. In such embodiments, the processor 605 may maintain multiple timing advance loops for the serving cell, each timing advance loop associated with a different one of the timing advance groups.

In some embodiments, the processor 605 may check a pathloss trigger condition in response to the change to the multiple active BWPs and report power headroom information for each of the multiple active BWPs. In such embodiments, checking the pathloss trigger condition in response to the change to the multiple active BWPs comprises checking a pathloss trigger condition for subset of the active BWPs.

In certain embodiments, the change to the multiple active BWPs includes switching a first BWP for second BWP. In such embodiments, checking the pathloss trigger condition in response to the change to the multiple active BWPs may include: taking a first pathloss measurement on the first BWP, taking a second pathloss measurement on the second BWP, calculating a pathloss difference using the first pathloss measurement to the second pathloss measurement, and triggering a power headroom report if the path loss difference is more than a threshold amount.

In some embodiments, the serving cell is a reference serving cell. In such embodiments, the transceiver 625 may receive a pathloss reference linking parameter that links an active downlink BWP to an active uplink BWP, wherein the processor 605 estimates a pathloss value for the active uplink BWP using the linked active downlink BWP. In certain embodiments, the linked active downlink BWP is one of an initially active downlink BWP within the reference serving cell and a default downlink BWP within the reference serving cell.

In certain embodiments, the processor 605 configures a HARQ entity for each active BWP of the serving cell, each HARQ entity maintaining a set of parallel HARQ processes. In some embodiments, the processor 605 configures a single HARQ entity for all active BWP of the serving cell. In such embodiments, the single HARQ entity is associated with a plurality of HARQ processes, wherein the plurality of HARQ processes are shared across the active BWPs.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to efficient management of multiple active BWPs. For example, the memory 610 may store BWP configurations, configured grant allocations, power control parameters, configuration and activation/deactivation status for serving cells and/or BWPs, and the like. In certain embodiments, the memory 610 also stores program code and related data, such as an operating system or other controller algorithms operating on the remote unit 105.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the user equipment apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

The transceiver 625 includes at least transmitter 630 and at least one receiver 635. One or more transmitters 630 may be used to provide UL communication signals to a base unit 110. Similarly, one or more receivers 635 may be used to receive DL communication signals from the base unit 110, as described herein. Although only one transmitter 630 and one receiver 635 are illustrated, the user equipment apparatus 600 may have any suitable number of transmitters 630 and receivers 635. Further, the transmitter(s) 630 and the receiver(s) 635 may be any suitable type of transmitters and receivers. In one embodiment, the transceiver 625 includes a first transmitter/receiver pair used to communicate with a mobile communication network over licensed radio spectrum and a second transmitter/receiver pair used to communicate with a mobile communication network over unlicensed radio spectrum.

Figure 7:
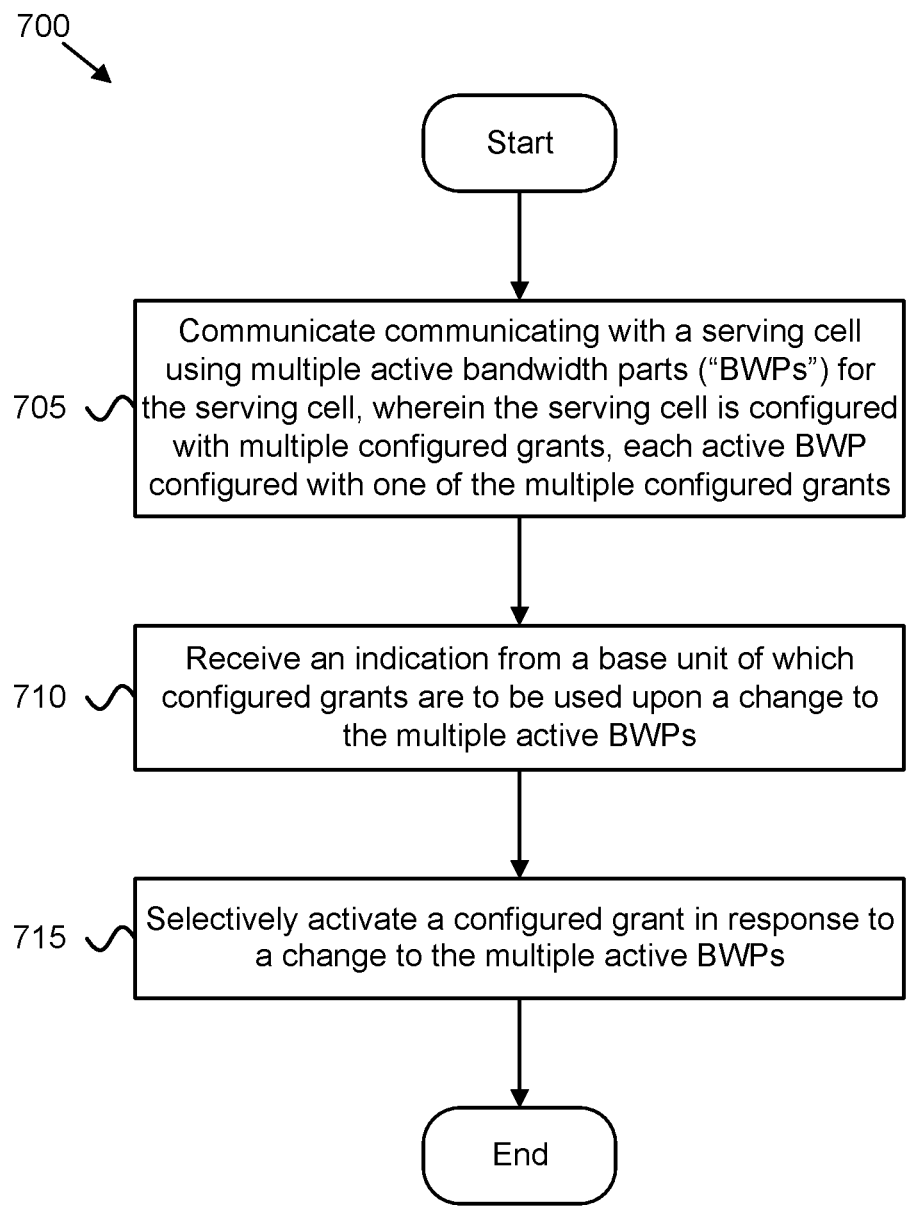
FIG. 7 is a flow chart diagram illustrating one method of efficient management of multiple active BWPs.

FIG. 7 is a schematic flow chart diagram illustrating one embodiment of a method 700 for efficient management of multiple active BWPs, according to embodiments of the disclosure. In some embodiments, the method 700 is performed by a UE, such as the remote unit 105, the UE 205, and/or the user equipment apparatus 600. In certain embodiments, the method 700 may be performed by a processor executing program code, for example, a microcontroller, a microprocessor, a CPU, a GPU, an auxiliary processing unit, a FPGA, or the like.

The method 700 begins and communicates 705 with a serving cell using multiple active bandwidth parts ("BWPs") for the serving cell. Here, the serving cell is configured with multiple configured grants, each active BWP configured with one of the multiple configured grants.

The method 700 includes receiving 710 an indication from a base unit of which configured grants are to be used upon a change to the multiple active BWPs. The method 700 includes selectively activating 715 a configured grant in response to a change to the multiple active BWPs. Here, selectively activating 715 a configured grant may include activating or deactivating one or more configured grants. The method 700 ends.

Disclosed herein is a first apparatus for efficient management of multiple active BWPs. The first apparatus may be implemented by the remote unit 105, the UE 205, and/or the user equipment apparatus 600. The first apparatus includes a processor and a transceiver that communicates with a serving cell using multiple active BWPs for the serving cell. Here, the serving cell is configured with multiple configured grants, each active BWP configured with one of the multiple configured grants. The processor receives an indication from a base unit of which configured grants are to be used upon a change to the multiple active BWPs and selectively activates a configured grant in response to a change to the multiple active BWPs.

In some embodiments of the first apparatus, the indication is received in a MAC CE. In such embodiments, the MAC CE may include a bitmap. Here, each bit of the bitmap may indicate whether a configured grant is to be activated or deactivated. In certain embodiments of the first apparatus, a number of active BWPs is greater than a number of activated configured grants. In some embodiments of the first apparatus, the transceiver receives an indication to transition to an inactive state. In such embodiments, the processor deactivates all active BWPs of the serving cell except a single BWP, the single BWP being one of an initial BWP and a default BWP.

In various embodiments of the first apparatus, the change to the multiple active BWPs is the activation of a BWP, the deactivation of a BWP, or the switching of an active BWP of the serving cell. In some embodiments of the first apparatus, the transceiver receives an indication to switch an active BWP, wherein the indication to switch an active BWP and the indication of which configured grants are to be used are included in the same message.

In some embodiments, the first apparatus supports a plurality of services, each service associated with a different active BWP. In certain embodiments of the first apparatus, the multiple active BWPs are selected from a set of configured BWPs of the serving cell. In such embodiments, the processor may map one or more logical channels to each of the multiple configured BWPs and prioritizing data from the logical channels for transmission on an uplink BWP.

In some embodiments of the first apparatus, the processor may check a pathloss trigger condition in response to the change to the multiple active BWPs and report power headroom information for each of the multiple active BWPs. In such embodiments, checking the pathloss trigger condition in response to the change to the multiple active BWPs comprises checking a pathloss trigger condition for subset of the active BWPs.

In certain embodiments, the change to the multiple active BWPs includes switching a first BWP for second BWP. In such embodiments, checking the pathloss trigger condition in response to the change to the multiple active BWPs may include: taking a first pathloss measurement on the first BWP, taking a second pathloss measurement on the second BWP, calculating a pathloss difference using the first pathloss measurement to the second pathloss measurement, and triggering a power headroom report if the path loss difference is more than a threshold amount.

In some embodiments of the first apparatus, the serving cell is a reference serving cell. In such embodiments, the transceiver may receive a pathloss reference linking parameter that links an active downlink BWP to an active uplink BWP, wherein the processor estimates a pathloss value for the active uplink BWP using the linked active downlink BWP. In certain embodiments, the linked active downlink BWP is one of an initially active downlink BWP within the reference serving cell and a default downlink BWP within the reference serving cell.

In certain embodiments of the first apparatus, the processor configures a HARQ entity for each active BWP of the serving cell, each HARQ entity maintaining a set of parallel HARQ processes. In some embodiments of the first apparatus, the processor configures a single HARQ entity for all active BWP of the serving cell. In such embodiments, the single HARQ entity is associated with a plurality of HARQ processes, wherein the plurality of HARQ processes are shared across the active BWPs.

In certain embodiments of the first apparatus, the change to the multiple active BWPs comprises switching a first BWP for a second BWP. In such embodiments, the processor may continue HARQ protocol operation across the first and second BWPs. In certain embodiments of the first apparatus, different ones of the active BWPs are associated with different timing advance groups. In such embodiments, the processor may maintain multiple timing advance loops for the serving cell, each timing advance loop associated with a different one of the timing advance groups.

Disclosed herein is a first method for efficient management of multiple active BWPs. The first method may be performed by a UE, such as the remote unit 105, the UE 205, and/or the user equipment apparatus 600. The first method includes communicating with a serving cell using multiple active BWPs for the serving cell. Here, the serving cell is configured with multiple configured grants, each active BWP configured with one of the multiple configured grants. The first method includes receiving an indication from a base unit of which configured grants are to be used upon a change to the multiple active BWPs and selectively activating a configured grant in response to a change to the multiple active BWPs.

In some embodiments, the indication is received in a MAC CE. In such embodiments, the MAC CE may include a bitmap. Here, each bit of the bitmap may indicate whether a configured grant is to be activated or deactivated. In certain embodiments, a number of active BWPs is greater than a number of activated configured grants. In some embodiments, the first method includes receiving an indication to transition to an inactive state and deactivating all active BWPs of the serving cell except a single BWP, the single BWP being one of an initial BWP and a default BWP.

In various embodiments, the change to the multiple active BWPs includes activating a BWP, deactivating a BWP, or switching an active BWP of the serving cell. In some embodiments, the first method includes receiving an indication to switch an active BWP, wherein the indication to switch an active BWP and the indication of which configured grants are to be used are included in the same message.

In some embodiments, the first method includes supporting a plurality of services, each service associated with a different active BWP. In certain embodiments, the multiple active BWPs are selected from a set of configured BWPs of the serving cell. In such embodiments, the first method may include mapping one or more logical channels to each of the multiple configured BWPs and prioritizing data from the logical channels for transmission on an uplink BWP.

In some embodiments, the first method includes checking a pathloss trigger condition in response to the change to the multiple active BWPs and reporting power headroom information for each of the multiple active BWPs. In such embodiments, checking the pathloss trigger condition in response to the change to the multiple active BWPs comprises checking a pathloss trigger condition for subset of the active BWPs.

In certain embodiments, the change to the multiple active BWPs includes switching a first BWP for second BWP. In such embodiments, checking the pathloss trigger condition in response to the change to the multiple active BWPs may include: taking a first pathloss measurement on the first BWP, taking a second pathloss measurement on the second BWP, calculating a pathloss difference using the first pathloss measurement to the second pathloss measurement, and triggering a power headroom report if the path loss difference is more than a threshold amount.

In some embodiments, the serving cell is a reference serving cell. In such embodiments, the first method may include receiving a pathloss reference linking parameter that links an active downlink BWP to an active uplink BWP and estimating a pathloss value for the active uplink BWP using the linked active downlink BWP. In certain embodiments, the linked active downlink BWP is one of an initially active downlink BWP within the reference serving cell and a default downlink BWP within the reference serving cell.

In certain embodiments, the first method includes configuring a HARQ entity for each active BWP of the serving cell, each HARQ entity maintaining a set of parallel HARQ processes. In some embodiments, the first method includes configuring a single HARQ entity for all active BWP of the serving cell. In such embodiments, the single HARQ entity is associated with a plurality of HARQ processes, wherein the plurality of HARQ processes are shared across the active BWPs.

In certain embodiments, the change to the multiple active BWPs comprises switching a first BWP for a second BWP. In such embodiments, the first method may include continuing HARQ protocol operation across the first and second BWPs. In certain embodiments, different ones of the active BWPs are associated with different timing advance groups. In such embodiments, the first method may include maintaining multiple timing advance loops for the serving cell, each timing advance loop associated with a different one of the timing advance groups.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a transceiver that communicates with a serving cell; and
a processor coupled to the transceiver, the processor configured to cause the apparatus to:
receive a configuration for a plurality of bandwidth parts ("BWPs") for the serving cell, wherein multiple BWPs are simultaneously active;
communicate with a serving cell using the multiple active BWPs, wherein communicating using multiple active BWPs comprises concurrently receiving and/or transmitting data on each of the multiple active BWPs;
receive a configuration for multiple configured grants for the serving cell, wherein each of the multiple active BWPs is configured with one of the multiple configured grants;
configure a separate Hybrid Automatic Repeat Request ("HARQ") entity for each active BWP of the serving cell, each HARQ entity maintaining a set of parallel HARQ processes;
receive a first indication to change a set of active BWPs;
receive a second indication from a base unit of which configured grants are to be used in response to the change to the set of active BWPs, wherein the second indication comprises a bitmap, each bit of the bitmap indicating whether a configured grant is to be activated or deactivated, wherein the first indication to change a set of active BWPs and the second indication of which configured grants are to be used are included in the same message; and
selectively activate a configured grant in response to the change to the set of active BWPs, wherein activating the configured grant in response to the change to the set of active BWPs comprises activating a configured grant for a previously deactivated BWP.

2. The apparatus of claim 1, wherein the first and second indications are received in a medium access control ("MAC") control element ("CE").

3. The apparatus of claim 1, wherein the change to the set of active BWPs comprises one of: activating, deactivating, or switching an active BWP of the serving cell.

4. The apparatus of claim 1, wherein a number of active BWPs is greater than a number of activated configured grants.

5. The apparatus of claim 1, wherein the apparatus supports a plurality of services, each service associated with a different active BWP.

6. The apparatus of claim 1, wherein the multiple active BWPs are selected from a set of configured BWPs of the serving cell, wherein the processor is further configured to cause the apparatus to:
map one or more logical channels to each of the multiple configured BWPs; and
prioritize data from the logical channels for transmission on an uplink BWP.

7. The apparatus of claim 1, wherein the processor is further configured to cause the apparatus to:
receive an indication to transition to an inactive state; and
deactivate all active BWPs of the serving cell except a single BWP, the single BWP being an initial BWP or a default BWP.

8. The apparatus of claim 1, wherein the processor is further configured to cause the apparatus to:
check a pathloss trigger condition in response to the change to the set of active BWPs; and
report power headroom information for each active BWPs.

9. The apparatus of claim 8, wherein, to check the pathloss trigger condition in response to the change to the set of active BWPs, the processor is further configured to cause the apparatus to check a pathloss trigger condition for subset of the active BWPs.

10. The apparatus of claim 8, wherein the change to the set of active BWPs comprises switching a first BWP for second BWP, wherein, to check the pathloss trigger condition in response to the change to the set of active BWPs, the processor is further configured to cause the apparatus to:
take a first pathloss measurement on the first BWP;
take a second pathloss measurement on the second BWP;
calculate a pathloss difference using the first pathloss measurement to the second pathloss measurement; and
trigger a power headroom report if the path loss difference is more than a threshold amount.

11. The apparatus of claim 1, wherein the serving cell is a reference serving cell, wherein the processor is further configured to cause the apparatus to:
receive a pathloss reference linking parameter that links an active downlink BWP to an active uplink BWP, and estimate a pathloss value for the active uplink BWP using the linked active downlink BWP.

12. The apparatus of claim 11, wherein the linked active downlink BWP is an initially active downlink BWP within the reference serving cell or a default downlink BWP within the reference serving cell.

13. The apparatus of claim 1, wherein the change to the set of active BWPs comprises switching a first BWP for a second BWP, wherein the processor is configured to cause the apparatus to continue HARQ protocol operation across the first and second BWPs.

14. The apparatus of claim 1, wherein different ones of the active BWPs are associated with different timing advance groups.

15. The apparatus of claim 14, wherein the processor is further configured to cause the apparatus to maintain multiple timing advance loops for the serving cell, each timing advance loop associated with a different one of the timing advance groups.

16. A method comprising:
receiving a configuration for a plurality of bandwidth parts ("BWPs") for the serving cell, wherein multiple BWPs are simultaneously active;
communicating with a serving cell using multiple active BWP for the serving cell, wherein communicating using multiple active BWPs comprises concurrently receiving and/or transmitting data on each of the multiple active BWPs;
receiving a configuration for with multiple configured grants for the serving cell, wherein each of the multiple active BWPs is configured with one of the multiple configured grants;

configuring a separate Hybrid Automatic Repeat Request ("HARQ") entity for each active BWP of the serving cell, each HARQ entity maintaining a set of parallel HARQ processes;

receiving a first indication to change a set of active BWPs;

receiving a second indication from a base unit of which configured grants are to be used in response to the change to the set of active BWPs, wherein the second indication comprises a bitmap, each bit of the bitmap indicating whether a configured grant is to be activated or deactivated, wherein the first indication to change a set of active BWPs and the second indication of which configured grants are to be used are included in the same message; and selectively activating a configured grant in response to the change to the set of active BWPs, wherein activating the configured grant in response to the change to the set of active BWPs comprises activating a configured grant for a previously deactivated BWP.

* * * * *